United States Patent
Guo et al.

(10) Patent No.: US 8,094,621 B2
(45) Date of Patent: Jan. 10, 2012

(54) FAST HANDOVER PROTOCOLS FOR WIMAX NETWORKS

(75) Inventors: Jianlin Guo, Malden, MA (US);
Raymond Yim, Cambridge, MA (US);
Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 454 days.

(21) Appl. No.: 12/370,750

(22) Filed: Feb. 13, 2009

(65) Prior Publication Data

US 2010/0208690 A1    Aug. 19, 2010

(51) Int. Cl.
*H04W 4/00* (2009.01)

(52) U.S. Cl. ......................... 370/331; 455/437

(58) Field of Classification Search .......... 370/328–329, 370/331–333, 336–338, 389, 392, 400–401; 455/432.1–432.2, 435.1–435.3, 436–439, 455/442
See application file for complete search history.

(56) References Cited

U.S. PATENT DOCUMENTS

| | | | | |
|---|---|---|---|---|
| 7,613,148 B2 * | 11/2009 | Hong et al. | ................. | 370/331 |
| 7,961,678 B2 * | 6/2011 | Lim et al. | ................. | 370/329 |
| 2005/0250499 A1 * | 11/2005 | Lee et al. | ................. | 455/437 |
| 2005/0265360 A1 * | 12/2005 | Kim et al. | ................. | 370/400 |
| 2006/0030309 A1 * | 2/2006 | Lee et al. | ................. | 455/422.1 |
| 2006/0178880 A1 * | 8/2006 | Zhang et al. | ................. | 704/233 |
| 2006/0234742 A1 * | 10/2006 | Kim et al. | ................. | 455/513 |
| 2007/0232305 A1 * | 10/2007 | Jung et al. | ................. | 455/435.1 |
| 2007/0238464 A1 * | 10/2007 | Lim et al. | ................. | 455/436 |
| 2008/0037480 A1 * | 2/2008 | Venkatachalam | ............. | 370/338 |
| 2009/0011790 A1 * | 1/2009 | Lee et al. | ................. | 455/525 |
| 2009/0019284 A1 * | 1/2009 | Cho et al. | ................. | 713/170 |
| 2009/0042567 A1 * | 2/2009 | Lim et al. | ................. | 455/434 |
| 2009/0186601 A1 * | 7/2009 | Hahn | ................. | 455/411 |
| 2009/0209254 A1 * | 8/2009 | Oguchi | ................. | 455/434 |
| 2010/0118702 A1 * | 5/2010 | Wu et al. | ................. | 370/235 |

OTHER PUBLICATIONS

R. Fantacci et al, "Analysis of Secure Handover for IEEE 802.1X-Based Wireless Ad Hoc Networks", IEEE Wireless Communications, Oct. 2007.

* cited by examiner

*Primary Examiner* — Kevin Mew
(74) *Attorney, Agent, or Firm* — Dirk Brinkman; Gene Vinokur

(57) ABSTRACT

A method performs handover of a mobile station (MS from a current base station (BSC) connected to a target base station (BST) via a backbone in a Worldwide interoperability for Microwave Access (WiMAX) mobile communication network. The MS, before handover, transmits a Connection Identifier Request (CID-REQ) to the BST via the BSC, and receiving a Connection Identifier Response (CID-RSP) from the BST via the BSC. The MS, before handover, transmits a Subscriber Station (SS) Basic Capability Request (SBC-REQ), and receives a SS Basic Capability Response (SBC-RSP) from the BST via the BSC. Then, the MS transmits a Ranging Request (RNG-REQ) to the BST, and receives a Ranging Response (RNG-RSP) from the BST. During the handover, the MS transmits a Registration Request (REG-REQ) to the BST, and receives a Registration Response from the BST to establish the connection between the MS and the BST.

11 Claims, 4 Drawing Sheets

FAST HANDOVER PROTOCOLS FOR WIMAX NETWORKS

FIELD OF THE INVENTION

This invention relates generally to wireless communication networks, and more particularly to fast handover (handoff) for WiMAX networks.

BACKGROUND OF THE INVENTION

A typical Worldwide Interoperability for Microwave Access (WiMAX) network based on the IEEE 802.16 standard, includes a set of base stations (BS), and a set of mobile stations (MS) (subscriber stations) served by each base station. A handover from one BS to another can be due to a number of reasons, such as MS mobility, network availability, service availability, network capability, quality of service (QoS), cost, user preference, etc. The handover can be initiated either by the BS or the MS.

There are two types of handover: hard handover and soft handover. In hard handover, the MS first disconnects from the current network and then connects to a target network. In soft handover, the MS first connects to the target network, and then disconnects from the current network.

Service continuity is a key to provide good service to mobile users during the handover. When the MS switches from one BS to another, the handover process should be seamless to mobile users, and ongoing services should not be interrupted. To achieve seamless handover, the amount of time taken for switching network connection must be minimized. According to the ITU TTA evaluation report in May 2007, MS-initiated hard handover takes at least 105 ms without authentication/authorization. WiMAX allows EAP authentication and RSA authorization. EAP authentication process may take seconds to complete as pointed out by R. Fantacci et al, "Analysis of Secure Handover for IEEE 802.1X-Based Wireless Ad Hoc Networks", IEEE Wireless Communications, October 2007. Therefore, some of network entry procedures need to be done before the handover takes place.

To facilitate the handover between the BSs, Macro Diversity Handover (MDHO) and Fast BS Switching (FBSS) are defined in the WiMAX standard. Both MDHO and FBSS are soft handover protocols. Both MDHO and FBSS are based on a set of BSs, called a diversity set. For the MS, its diversity set changes dynamically. There are several requirements enforced on for both MS and its diversity set in MDHO and FBSS procedures. The MS monitors the BSs and dynamically modifies the diversity set accordingly. BSs in a diversity set share information. There is no authentication or authorization involved in MDHO and FBSS, which can lead to serious security issues. In the invented fast handover protocols, there is no diversity set and handover process can be completed within 100 ms with authentication/authorization for MS-initiated hard handover.

As shown in FIG. 1, a conventional network entry process for a MS 101 and a BS 102 in a WiMAX network. The process includes ten data interchange steps. Such network entry may take hundreds of milliseconds to complete, which is not suitable for transparent handover for a highly mobile station, or an application with a high QoS requirement. These steps are self explanatory, and described in greater detail in the WiMAX standard.

SUMMARY OF THE INVENTION

The embodiments of the invention provide a novel fast handover protocol for mobile stations (MS) in WiMAX networks including base stations (BS). The handover protocol performs basic capability negotiation, and the authentication/authorization procedures, before the handover process, to minimize the time that connectivity is interrupted during the handover. The protocol does not manage the diversity set.

The embodiments include:
A method for requesting a basic connection Identifier (CID), and primary management CID before initial ranging.
A method for negotiating basic capabilities between the MS and target BS prior to the initial ranging.
A method enabling the BS to authenticate the MS, and distribute a key using public-key cryptography authorization protocol, e.g., RSA, prior to the initial ranging.
A method for a WiMAX authentication, authorization and accounting (AAA) server to authenticate the MS and distribute the key in advance, using extensible authentication protocol (EAP) prior to the initial ranging.

DETAILED DESCRIPTION OF THE PREFERRED EMBODIMENTS

Figure 1:
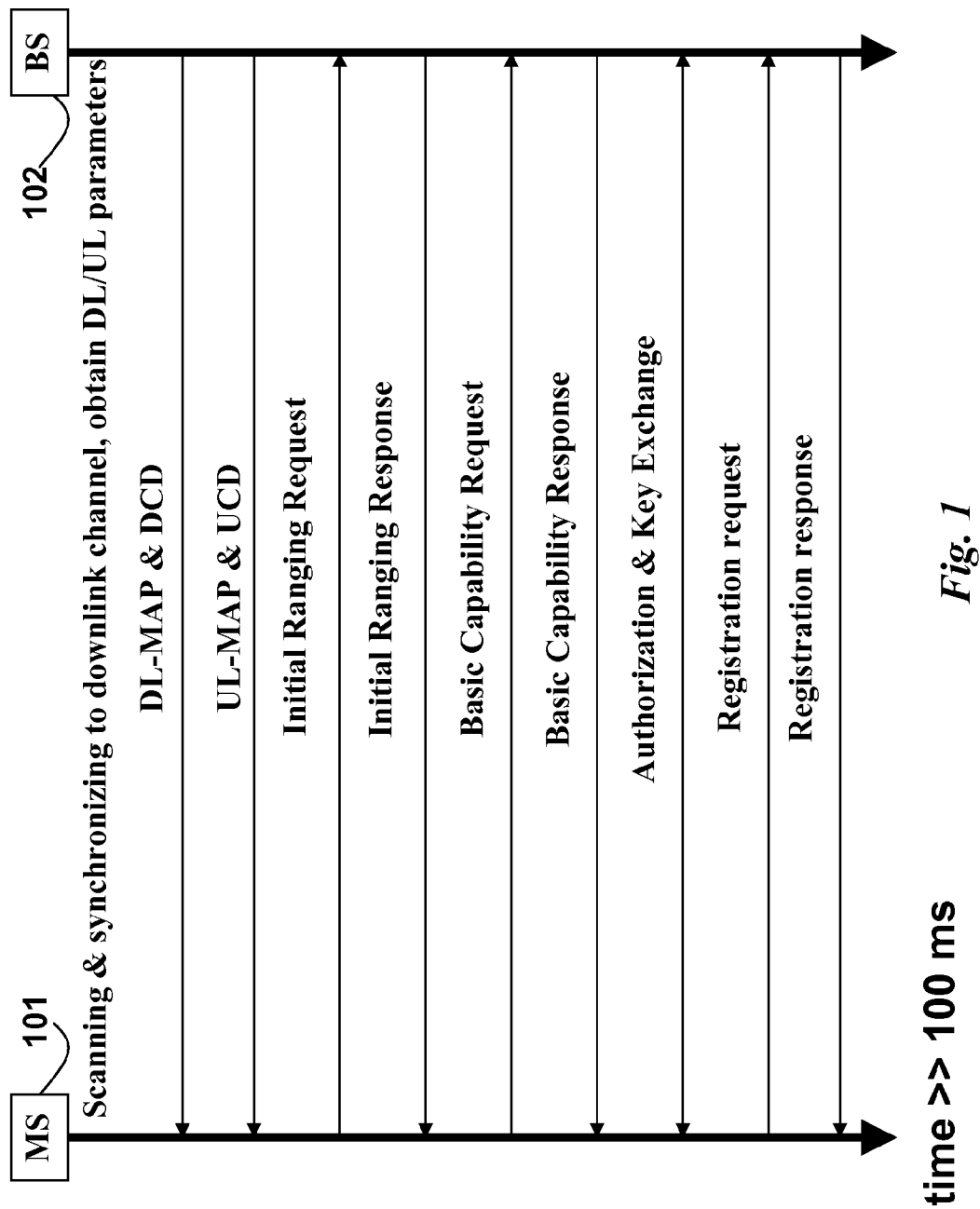
FIG. 1 is a timing diagram of a conventional entry procedure in a WiMAX network.
Figure 2:
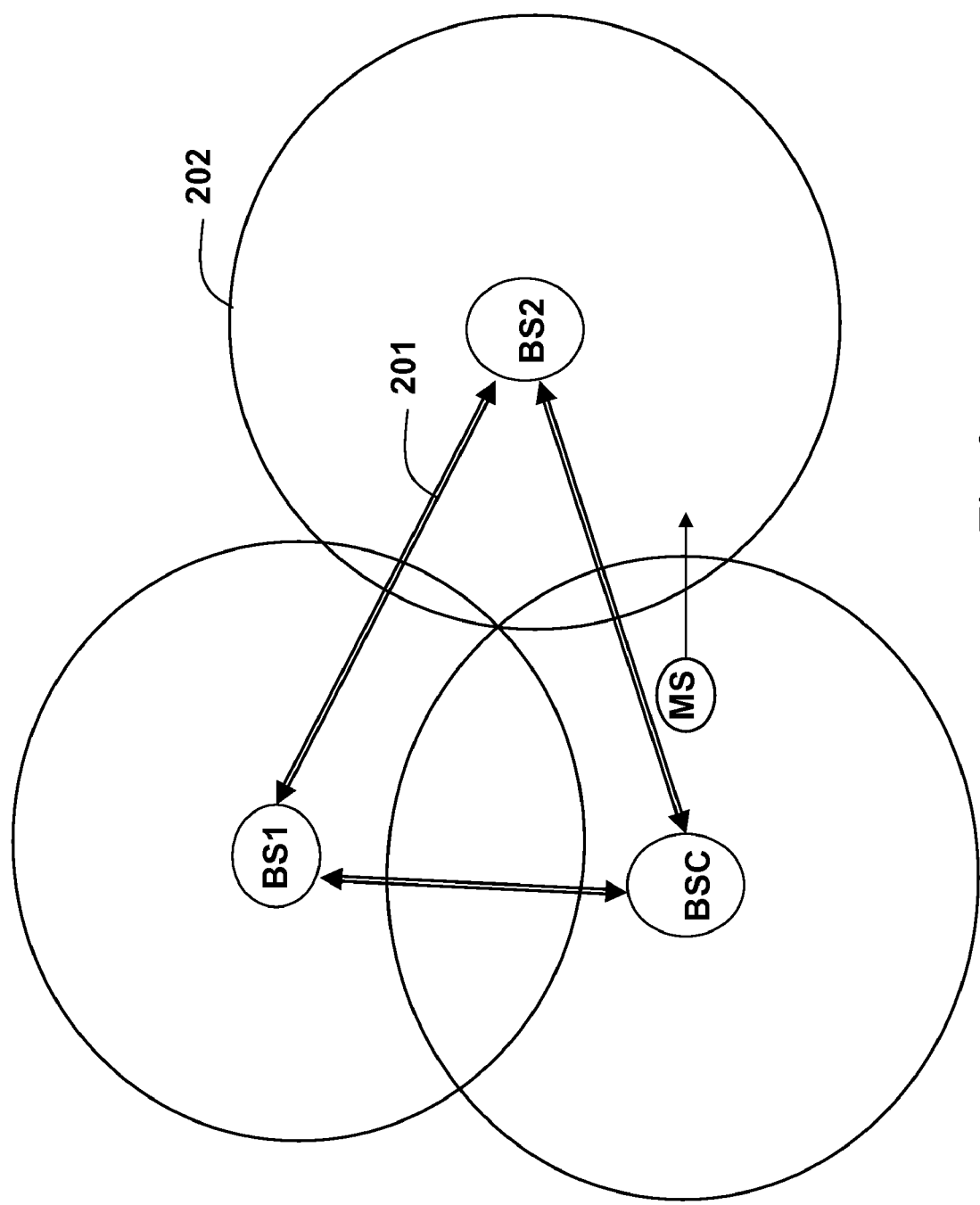
FIG. 2 is a schematic including three base stations an a mobile station according to embodiments of the invention.

FIG. 2 shows a WiMAX network including three cells and three base stations (BS), including a current BSC, and BS1 and BS2, and a mobile station (MS) also known as subscriber station (SS). The BSs are connected by a backbone network or infrastructure 201. The MS is moving in the direction shown by the arrow. The adjacent BS coverage areas 202 overlap. Each BS has an associated authentication, authorization and accounting (AAA) server.

The MS is registered with the current BSC. The handover protocols according to embodiments of our invention complete basic capability negotiation and the authentication/authorization procedures before handover operation takes place. Authentication/authorization is the most time-consuming operation in network entry due to the fact that the authentication/authorization process, key generation and distribution may take up to hundreds of milliseconds to complete. Also, the AAA server can be far away, and connected to the network through many hops in the backbone network.

The EAP is an authentication framework. It provides common functions and a negotiation of the desired authentication method. Each protocol using EAP defines a way to encapsulate EAP messages. WiMAX defines EAP-Start, EAP-Transfer, and EAP-Complete messages for that purpose. For both RSA authorization and EAP authentication, an Authorization Key (AK) is generated as a shared secret between the MS and BS to secure further transactions.

For the RSA authorization, the BS and the MS verify their identities using a manufacturer-issued X.509 digital certificate, which is an ITU-T standard for a public key infrastructure (PKI) for single sign-on and Privilege Management Infrastructure (PMI). X.509 specifies, amongst other things, standard formats for public key certificates, certificate revocation lists, attribute certificates, and a certification path validation.

Figure 3:
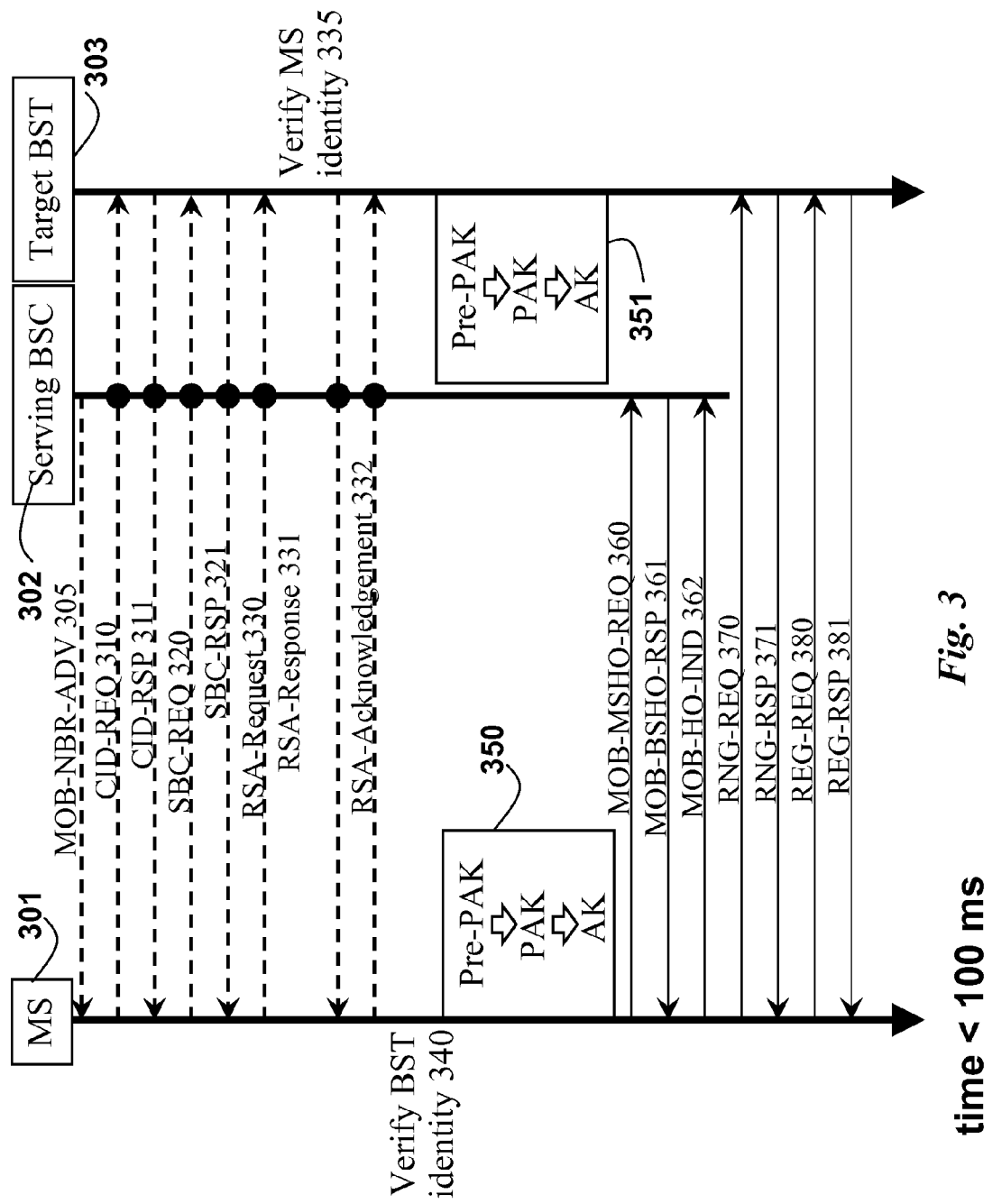
FIG. 3 is a timing diagram of fast handover according to embodiments of the invention.

As shown in FIG. 3, the MS obtains the information about adjacent BSs through a Neighbor Advertisement (MOB-NBR-ADV) message 305 broadcasted by the BSC. BSs supporting mobile functionality are capable of transmitting a MOB-NBR-ADV management message at a periodic interval to identify the network and define the characteristics of adjacent BSs about potential MS seeking initial network entry or handover. A MS may negotiate basic capabilities and perform pre-authentication/authorization with all adjacent BSs, or selected adjacent BSs before handover process takes place. The capability negotiation and authentication/authorization can be done via the BSC to realize the fast handover.

Figure 4:
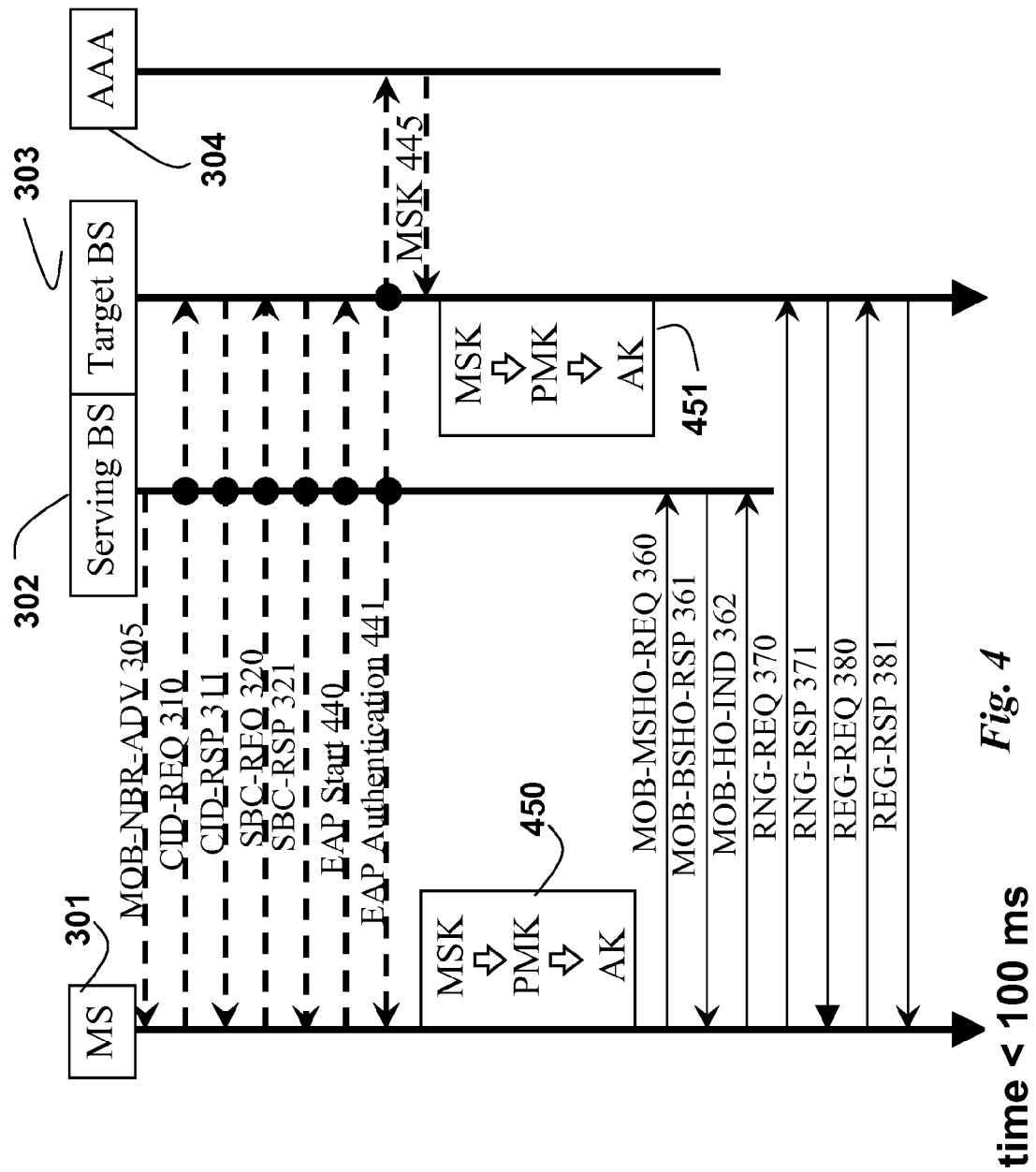
FIG. 4 is a timing diagram of fast handover protocol with employing EAP authentication according to embodiments of the invention.

FIG. 3 and FIG. 4 show the fast handover protocols according to embodiments of the invention. The handover for the MS 301 is from the current BSC 302 to the target BST 303. To facilitate the fast handover, we provide a Connection Identifier Request (CID-REQ) 310, and a Connection Identifier Response (CID-RSP) 311.

In the CID-REQ message, the MS 301 transmits its Media Access Control (MAC) address via the current serving BSC 302 to the target BST 303. Upon receipt of CID-REQ message, the target BST assigns a Basic CID and a Primary Management CID to the requesting MS and transmits the assigned CIDs in the CID-RSP message via current serving BSC to requesting MS. The target BST and the requesting MS use assigned the Basic CID and Primary CID for capability negotiation, authentication/authorization, and network entry process.

Fast Handover with RSA Authorization

FIG. 3 shows the fast handover protocol from current serving BSC to target BST with the RSA authorization. The MS intending for handover monitors the periodic MOB-NBR_ADV message from the current serving BSC, and obtains information about adjacent BSs. Then, the MS selects one or more target BSs to for the handover. The MS communicates with target BSs through its current serving BSC, before the MS is handed over to the target BST.

To prepare for fast handover, the MS first transmits a CID-REQ message to the target BS. In response, to the CID-REQ message, the target BS transmits back a CID-RSP message to the MS. The CID-RSP message contains the Basic Capabilities CID and Primary Management CID assigned to the requesting MS.

Then the MS negotiates the basic capabilities with the target BST by transmitting a SBC-REQ (SS Basic Capability Request) message 320. The basic capabilities include bandwidth allocation support, physical parameters supported, and security negotiation parameters. The target BST responds with a SBC-RSP (SS Basic Capability Response) message 321 with an intersection of the MS and target BS capabilities.

If the MS and target BST agree to use RSA authorization, the MS transmits an RSA-Request message 330 to target BS. The RSA-Request message contains the X.509 digital certificate, and other required parameters. The X.509 digital certificate contains MS's public key and MAC address. The target BS knows the manufacturer's public key and can verify 335 the MS's identity. The target BST activates a pre-PAK (pre-Primary Authorization Key). The target BS transmits a RSA-Response message 331 to the MS, which is acknowledged 332. The RSA-Response message contains the pre-PAK encrypted with MS's public key, target BS's X.509 digital certificate, and other security parameters.

The MS also knows manufacturer's public key and can verify 340 the target BS's identity. The MS and target BS respectively derive 350-351 a PAK (Primary Authorization Key) from the pre-PAK, MS's MAC address and target BS's BSID. The MS and target BS then generate an AK from PAK, MS's MAC address and target BS's BSID. The AK is the shared secret between the MS and target BS and is used by the MS and target BST for secure communications. Before the MS starts handover process, the MS needs to refresh the AK with target BS according the length of AK's life time.

After the above initialization, during the actual handover, the MS and the BSC exchange MOB-MSHO-REQ 360, MOB-BSHO-RSP 361, and MOB-HO-IND 362. Then the MS and BST only need to perform the ranging 370, 371 and registration 380, 381 for MS to enter the network.

Fast Handover with EAP Authentication

FIG. 4 shows the fast handover protocol from current serving BSC to target BST with the EAP authentication at the AAA server 304. Again, the MS obtains information about adjacent BSs via the periodic MOB-NBR_ADV message broadcasted by the current serving BSC. The MS selects preferred BSs as target BSs for fast handover. The MS communicates with target BSs through its current serving BS. In this case, an AAA server is also involved for the EAP authentication. The AAA server may be located away from the target BST. The AAA server and target BST communicate via a secured channel.

The MS requests CIDs and negotiates basic capabilities with target BS. If the MS and target BS agree to use EAP authentication, the MS starts the EAP authentication process by transmitting an EAP-Start message 440 to target BS, which forwards the MS's request to the corresponding AAA server. The MS and AAA server then start the EAP authentication process 441. Target BS bridges the EAP messages between MS and AAA server. When the MS receives the EAP payload from an EAP method for transmission to the target BST, or when target BST has the EAP payload received from the EAP method for transmission to the MS, the EAP-Transfer message is used to encapsulate the EAP payload. The product of EAP authentication is a Master Session Key (MSK) 445, which is known to the AAA server and the MS. The AAA server transfers the MSK to target BS. The MS and target BST use the MSK to derive a Pairwise Master Key (PMK). The MS and target BS use PMK, target BS's BSID and MS's MAC address to generate an AK, which is the shared secret between the MS and target BS.

The MS and target BS maintain 450-451 cached PMK and AK according to the policy in WiMAX specification. Prior to the handover process, the MS needs to refresh the AK with target BS according to the length of AK's lifetime. During the actual handover, the MS only needs to perform the ranging and registration procedures to enter the network.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for performing handover of a mobile station (MS) from a current base station (BSC) connected to a target base station (BST) via a backbone in a Worldwide interoperability for Microwave Access (WiMAX) mobile communication network, comprising:

transmitting by the MS, before handover, a Connection Identifier Request (CID-REQ) to the BST via the BSC, and receiving a Connection Identifier Response (CID-RSP) from the BST via the BSC;

transmitting by the MS, before handover, a Subscriber Station (SS) Basic Capability Request (SBC-REQ), and receiving a SS Basic Capability Response (SBC-RSP) from the BST via the BSC;

transmitting by the MS a Ranging Request (RNG-REQ) to the BST, and receiving a Ranging Response (RNG-RSP) from the BST;

transmitting by the MS, during handover, a Registration Request (REG-REQ) to the BST, and receiving a Registration Response from the BST; and establishing a connection between the MS and the BST.

2. The method of claim 1, wherein the CID-REQ includes a Media Access Control (MAC) address of the MS.

3. The method of claim 1, wherein the CID-RSP includes a Basic CID and a Primary Management CID.

4. The method of claim 3, wherein the MS and the BST use the Basic CID and Primary Management CID for capability negotiation, authentication and authorization, and network entry process.

5. The method of claim 3, wherein the basic capabilities include bandwidth allocation support, physical parameters supported, and security negotiation parameters.

6. The method of claim 1, further comprising;

selecting the BST in the MS using a Neighbor Advertisement (MOB-NBR-ADV) message broadcast periodically by the BSC.

7. The method of claim 4, wherein the MS and the BST agree to use RSA authorization during the negotiation, and further comprising before handover, transmitting a RSA Request (RSA-REQ) from the MS to the BST via the BSC, and receiving a RSA-Response (RSA_RSP) from the BST via the BSC.

8. The method of claim 7, wherein the RSA-REQ includes a X.509 digital certificate.

9. The method of claim 8, further comprising:

verifying the MS and the BST using the X.509 digital certificate.

10. The method of claim 4, wherein the MS and the BST agree to use an extensible authentication protocol (EAP), and further comprising before handover, transmitting an EAP Start (EAP-Start) from the MS to the BST via the BSC, and receiving an EAP Authentication from the BST via the BSC.

11. The method of claim 10, further comprising:

receiving in the MS and the BSC a Master Key from an authentication, authorization and accounting (AAA) server.

* * * * *